United States Patent [19]
Hagimori

[11] Patent Number: 5,644,434
[45] Date of Patent: Jul. 1, 1997

[54] ZOOM LENS SYSTEM

[75] Inventor: Hitoshi Hagimori, Nana-ken, Japan

[73] Assignee: Minolata Co. Ltd., Osaka, Japan

[21] Appl. No.: 432,629

[22] Filed: May 2, 1995

[30] Foreign Application Priority Data

May 16, 1994 [JP] Japan .................................. 6-101101

[51] Int. Cl.⁶ .................................................. G02B 15/14
[52] U.S. Cl. .................................. 359/689; 359/684
[58] Field of Search .................................. 359/689, 684, 359/683

[56] References Cited

U.S. PATENT DOCUMENTS

| | | | |
|---|---|---|---|
| 5,035,148 | 7/1991 | Ikemori et al. | 359/689 |
| 5,268,792 | 12/1993 | Kreitzer et al. | 359/689 |
| 5,270,857 | 12/1993 | Oizumi et al. | 359/554 |

FOREIGN PATENT DOCUMENTS

| | | |
|---|---|---|
| 6474521 | 3/1989 | Japan . |
| 1116615 | 5/1989 | Japan . |
| 2136811 | 5/1990 | Japan . |

*Primary Examiner*—Scott J. Sugarman
*Attorney, Agent, or Firm*—Price, Gess & Ubell

[57] ABSTRACT

A zoom lens system consists of sequentially from the object side a first lens unit having a negative refractive power, a second lens unit having a positive refractive power and a third lens unit having a negative refractive power. Zooming is performed by shifting the second lens unit and the third lens unit. The first lens unit keeps stationary during the zooming. Focusing is accomplished by shifting the second lens unit. The lengths of the first and the second lens unit along the optical axis are optimized so as to fulfill the conditions. The zoom lens system is suitable for particularly underwater cameras.

21 Claims, 15 Drawing Sheets

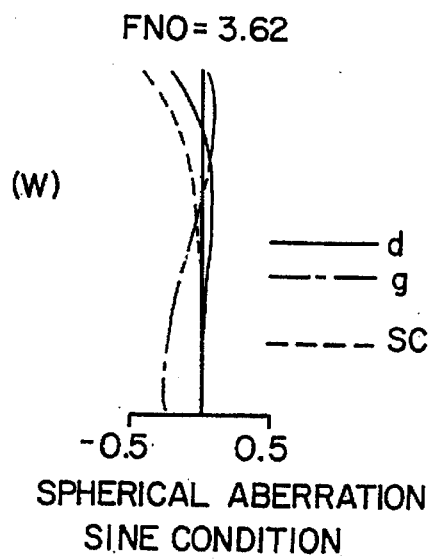
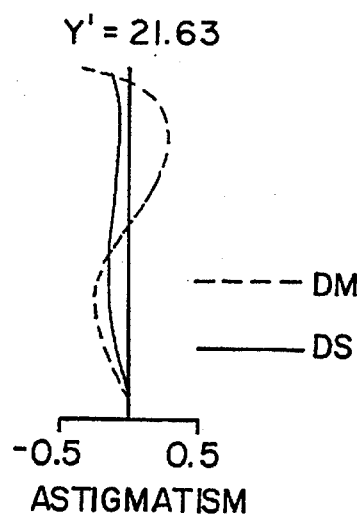
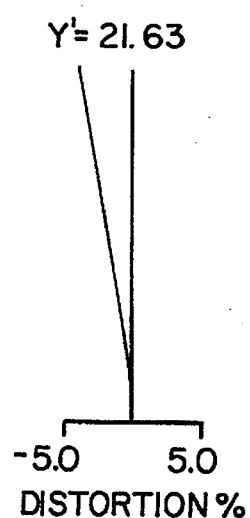
FIG. 7A
FNO=3.62
(W)
— d
—·— g
----- SC
-0.5    0.5
SPHERICAL ABERRATION
SINE CONDITION
FIG. 7B
Y'=21.63
----- DM
— DS
-0.5    0.5
ASTIGMATISM
FIG. 7C
Y'=21.63
-5.0    5.0
DISTORTION %
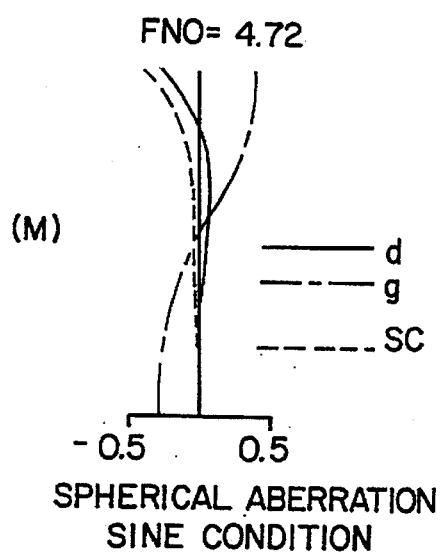
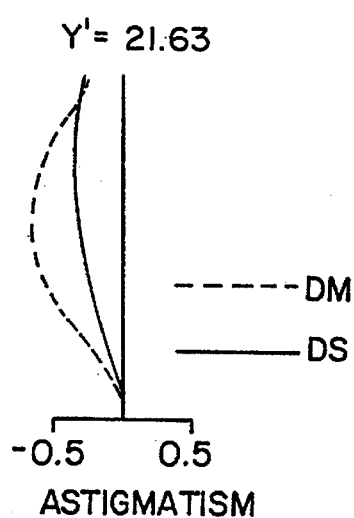
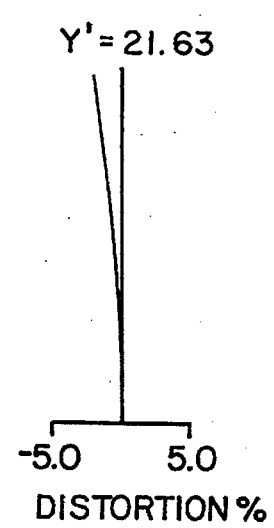
FIG. 8A
FNO=4.72
(M)
— d
—·— g
----- SC
-0.5    0.5
SPHERICAL ABERRATION
SINE CONDITION
FIG. 8B
Y'=21.63
----- DM
— DS
-0.5    0.5
ASTIGMATISM
FIG. 8C
Y'=21.63
-5.0    5.0
DISTORTION %

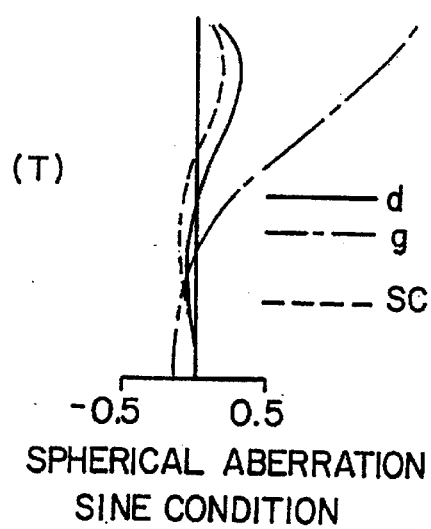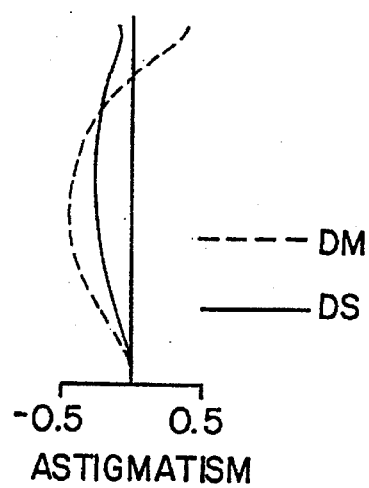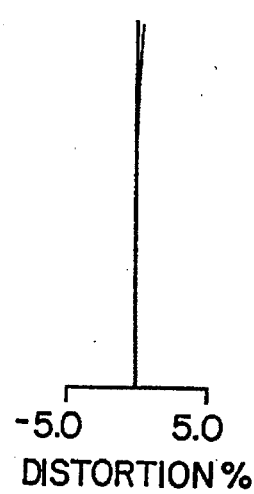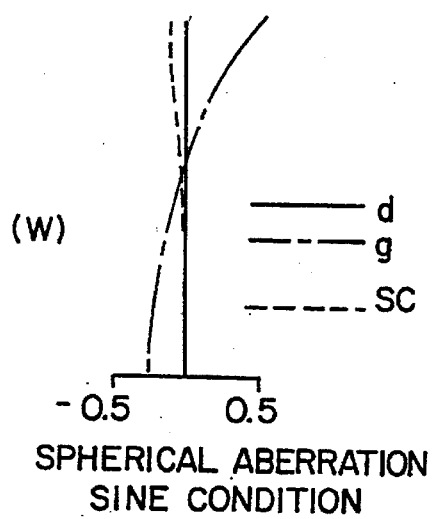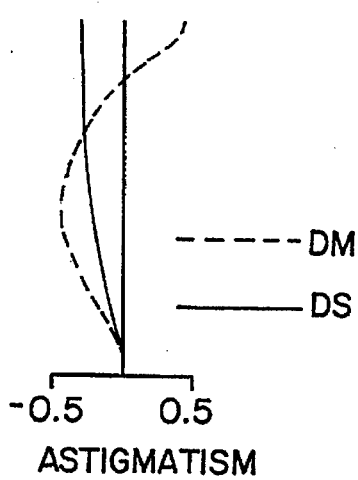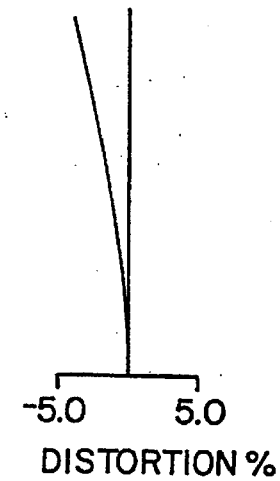

(M)

FNO= 4.68
—— d
—·— g
---- SC
-0.5   0.5
SPHERICAL ABERRATION
SINE CONDITION

Y'= 21.63
---- DM
—— DS
-0.5   0.5
ASTIGMATISM

Y'= 21.63
-5.0   5.0
DISTORTION %

(T)

FNO= 5.85
—— d
—·— g
---- SC
-0.5   0.5
SPHERICAL ABERRATION
SINE CONDITION

Y'= 21.63
---- DM
—— DS
-0.5   0.5
ASTIGMATISM

Y'= 21.63
-5.0   5.0
DISTORTION %

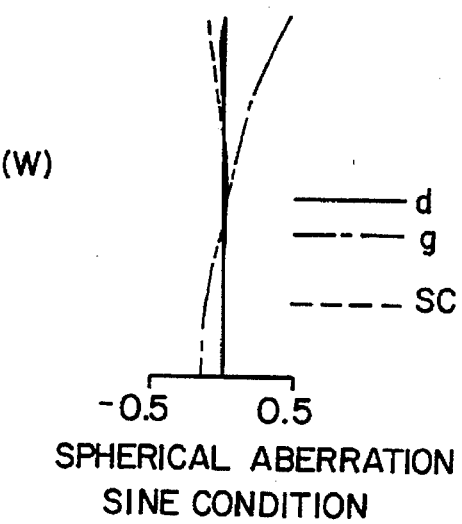
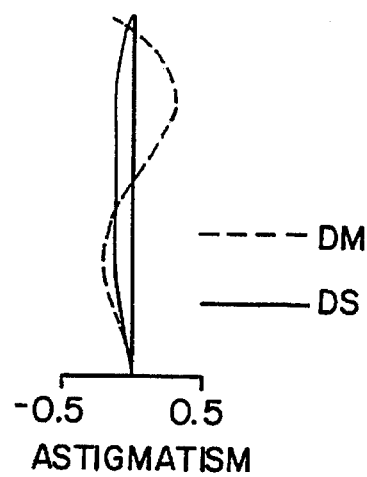
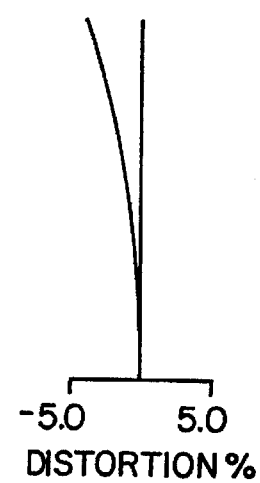
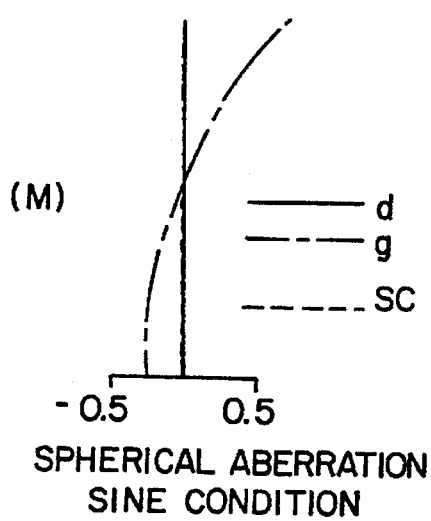
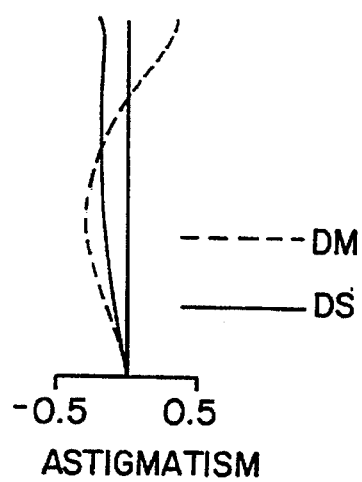
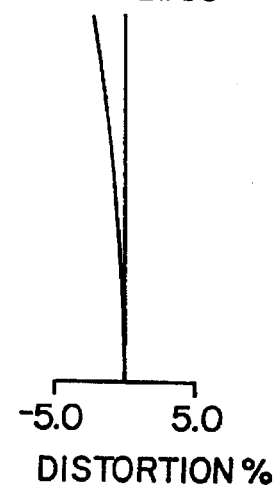

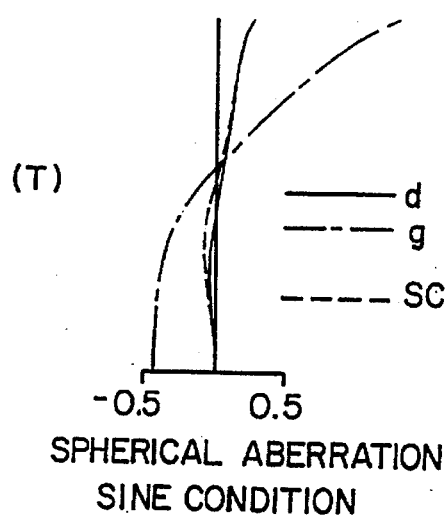
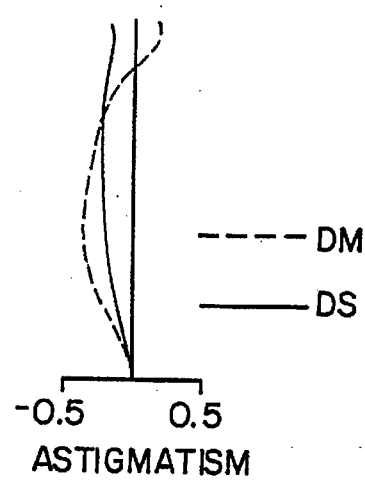
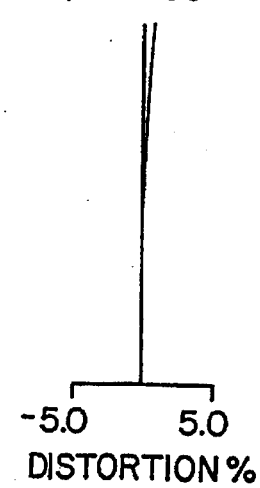
FIG. 15A
FNO=6.11
(T)
d
g
SC
-0.5   0.5
SPHERICAL ABERRATION
SINE CONDITION
FIG. 15B
Y'=21.63
----DM
——DS
-0.5   0.5
ASTIGMATISM
FIG. 15C
Y'=21.63
-5.0   5.0
DISTORTION %
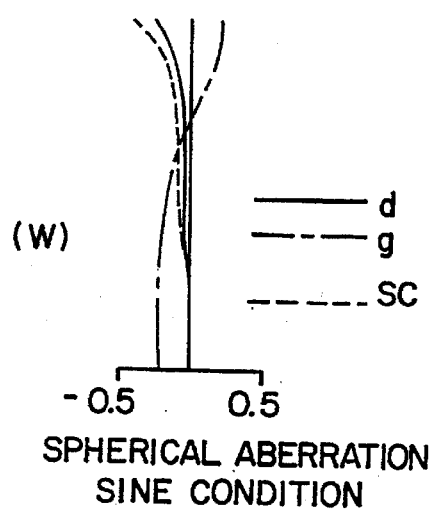
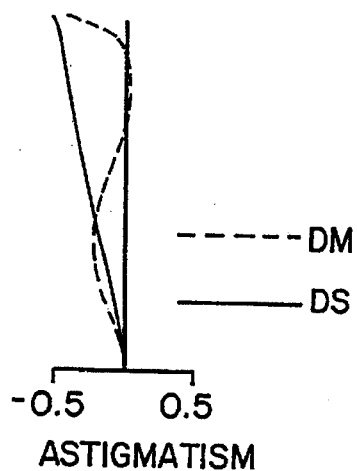
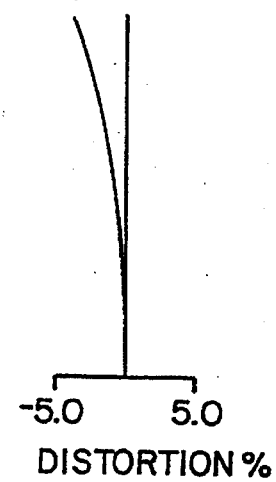
FIG. 16A
FNO=3.62
(W)
d
g
SC
-0.5   0.5
SPHERICAL ABERRATION
SINE CONDITION
FIG. 16B
Y'=21.63
----DM
——DS
-0.5   0.5
ASTIGMATISM
FIG. 16C
Y'=21.63
-5.0   5.0
DISTORTION %

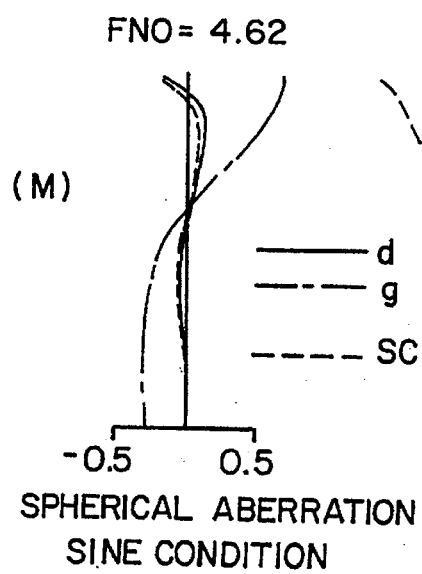
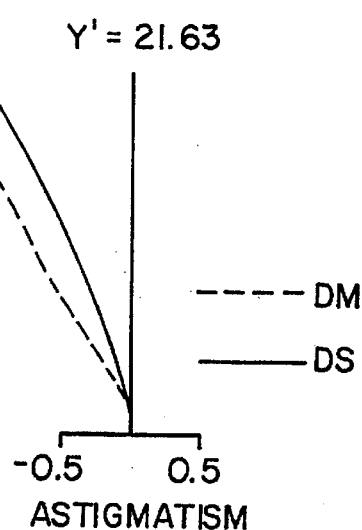
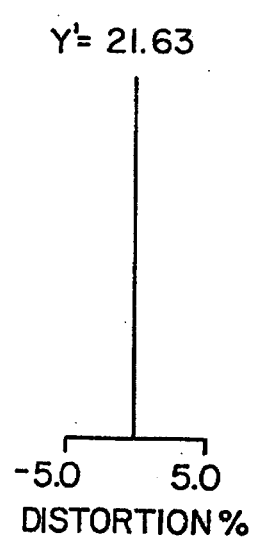
FIG. 17A  FIG. 17B  FIG. 17C
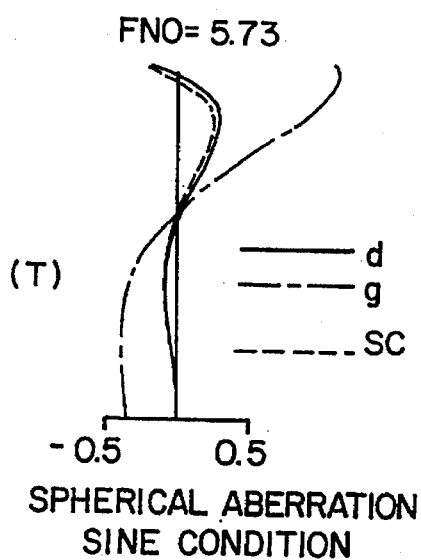
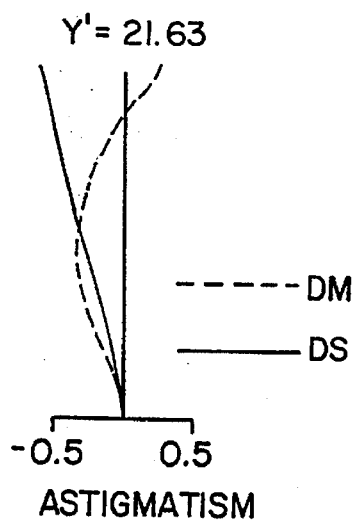
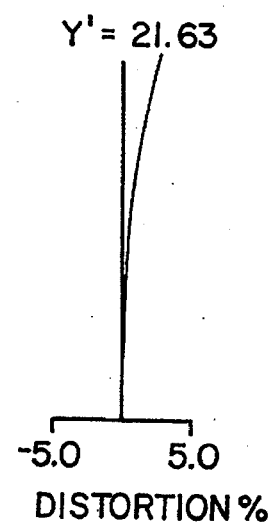
FIG. 18A  FIG. 18B  FIG. 18C FNO=3.62
—— d
—·— g
---- SC
-0.5   0.5
SPHERICAL ABERRATION
SINE CONDITION

Y'=21.63
---- DM
—— DS
-0.5   0.5
ASTIGMATISM

Y'=21.63
-5.0   5.0
DISTORTION %

FNO=4.68
—— d
—·— g
---- SC
-0.5   0.5
SPHERICAL ABERRATION
SINE CONDITION

Y'=21.63
---- DM
—— DS
-0.5   0.5
ASTIGMATISM

Y'=21.63
-5.0   5.0
DISTORTION %

FNO= 5.86 d
g
SC

-0.5  0.5
SPHERICAL ABERRATION
SINE CONDITION

Y'= 21.63

---- DM
—— DS

-0.5  0.5
ASTIGMATISM

Y'= 21.63

-5.0  5.0
DISTORTION %

FNO= 3.62 d
g
SC

-0.5  0.5
SPHERICAL ABERRATION
SINE CONDITION

Y'= 21.63

---- DM
—— DS

-0.5  0.5
ASTIGMATISM

Y'= 21.63

-5.0  5.0
DISTORTION %

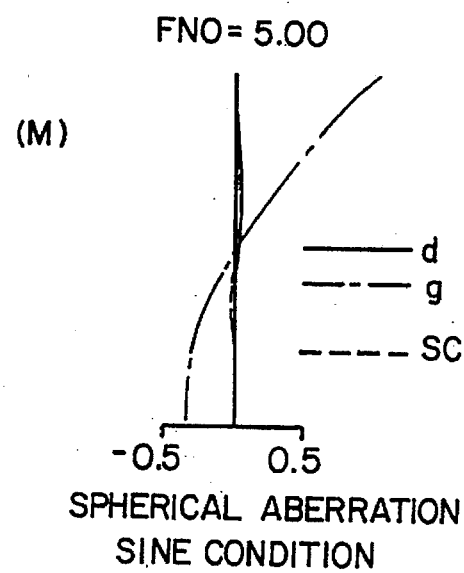
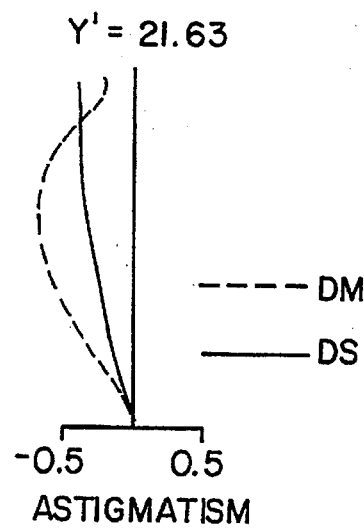
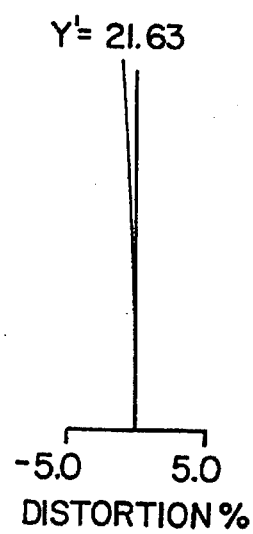
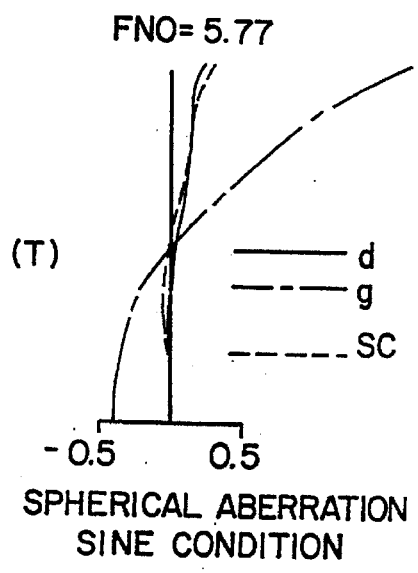
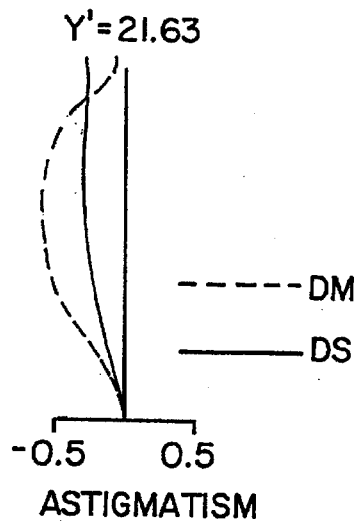
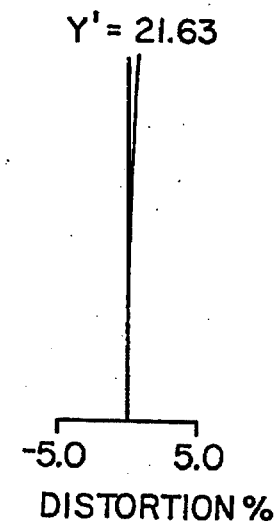

ZOOM LENS SYSTEM

BACKGROUND OF THE INVENTION

1. Field of the Invention

This invention relates to a compact zoom lens system, and more particularly to a compact zoom lens system suitable for lens shutter cameras, particularly underwater cameras.

2. Description of the Related Art

One type of camera reflecting the trend toward outdoor living in recent years is the underwater camera. An underwater camera must have an optical system suitable for underwater photo-taking. For example, if a zoom lens system suitable for underwater photo-taking is to be realized, the condition that the lens unit that comes in contact with water be motionless during zooming should be met.

One construction to meet this condition is a system in which a fixed non-powered barrier that does not move during zooming is located in front of a second zoom lens unit comprising positive and negative lenses. Conventionally, a system comprising a first lens unit having a negative refractive power, a second lens unit having a positive refractive power and a third lens unit having a negative refractive power, in that order from the object side, in which the second and third lens units are moved for zooming while the first lens unit is fixed during zooming, has been proposed as well (Japanese Laid-Open Patents Sho 64-74521, Hei 1-116615, etc.)

However, with the former construction, because the effective aperture of the barrier is large, the camera cannot be made compact in terms of its height and width. On the other hand, with the latter construction, because the length of the lens system along the optical axis is large, the camera cannot be made compact in terms of its depth.

SUMMARY OF THE INVENTION

The main object of the present invention is to provide a zoom lens system in which compactness is not lost even where the first lens unit is fixed during zooming, and which has a high level of optical performance.

This and other objects of the present invention are achieved by providing a zoom lens system containing a first lens unit having a negative refractive power, a second lens unit having a positive refractive power and a third lens unit having a negative refractive power, in that order from the object side, wherein zooming is performed by changing the distances between the lens units, and wherein the second lens unit contains at least one positive lens and one negative lens and the lengths of the first and second lens units are optimized.

These and other objects, advantages and features of the present invention will become apparent from the following descriptions thereof, taken in conjunction with the accompanying drawings which illustrate specific embodiments of the invention.

BRIEF DESCRIPTION OF THE DRAWINGS

FIGS. 7A, 7B and 7C show aberration curves in the shortest focal length condition in the first embodiment.

FIGS. 8A, 8B and 8C show aberration curves in the middle focal length condition in the first embodiment.

FIGS. 9A, 9B and 9C show aberration curves in the longest focal length condition in the first embodiment.

FIGS. 10A, 10B and 10C show aberration curves in the shortest focal length condition in the second embodiment.

FIGS. 13A, 13B and 13C show aberration curves in the shortest focal length condition in the third embodiment.

FIGS. 14A, 14B and 14C show aberration curves in the middle focal length condition in the third embodiment.

FIGS. 15A, 15B and 15C show aberration curves in the longest focal length condition in the third embodiment.

FIGS. 16A, 16B and 16C show aberration curves in the shortest focal length condition in the fourth embodiment.

FIGS. 17A, 17B and 17C show aberration curves in the middle focal length condition in the fourth embodiment.

FIGS. 18A, 18B and 18C show aberration curves in the longest focal length condition in the fourth embodiment.

FIGS. 23A, 23B and 23C show aberration curves in the middle focal length condition in the sixth embodiment.

FIGS. 24A, 24B and 24C show aberration curves in the longest focal length condition in the sixth embodiment.

DETAILED DESCRIPTION OF THE PREFERRED EMBODIMENTS

Figure 1:
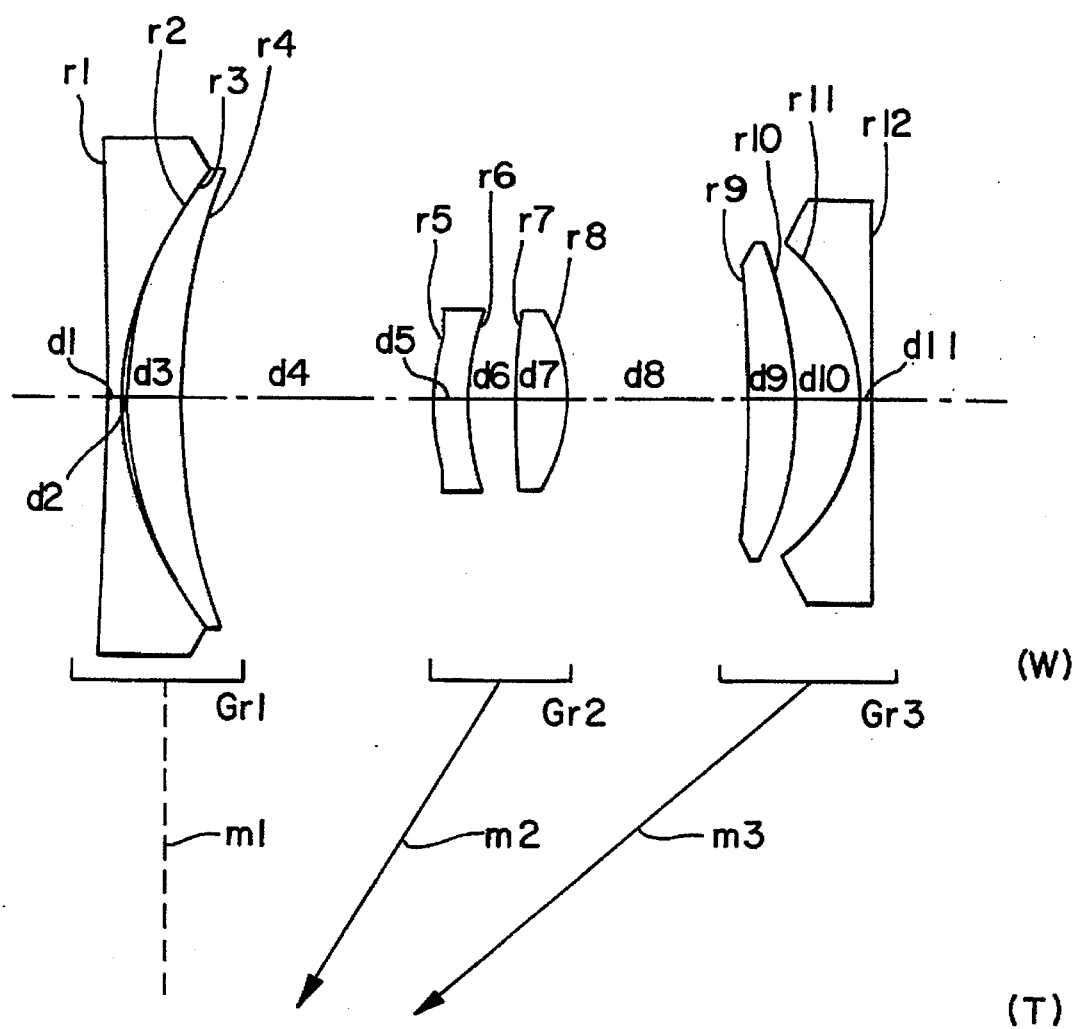
FIG. 1 shows the construction of the lenses in a first embodiment of the present invention.

The embodiments of the present invention are explained below. The present invention is a zoom lens system containing a first lens unit having a negative refractive power, a second lens unit having a positive refractive power and a third lens unit having a negative refractive power, in that order from the object side, wherein zooming is carried out by changing the distances between the various lens units. In this zoom lens system, the second lens unit contains at least one positive lens and one negative lens. It also meets the following conditions (1) and (2).

$$0.08 < t1/y' < 0.25 \tag{1}$$

$$0.08 < t2/y' < 0.28 \tag{2}$$

In said conditions, t1 represents the length of the first lens unit along the optical axis, t2 represents the length of the second lens unit along the optical axis, and y' represents the diagonal length of the film surface.

By means of the construction in which the lens units are aligned in the order of negative, positive and negative from the object side and in which the first lens unit is allowed to have a certain level of power, the effective aperture of the first lens unit can be reduced and the amount of movement of the second and third lens units can be reduced at the same time. In addition, by reducing the length of the first and second lens units along the optical axis, the camera's depth can be reduced as well.

If t1/y' is below the lower limit in condition (1), the length of the entire first lens unit is small, which makes it difficult to compensate for the curvature of field and coma aberration caused by the difference in the height of the light rays. In addition, since the power of each lens of the first lens unit cannot be made as large as necessary because of the edge thickness of the positive lens of the first lens unit, coma aberration compensation becomes difficult. If t1/y' exceeds the upper limit in condition (1), the length of the first lens unit becomes large, which makes it impossible to reduce the length of the optical system along the camera's depth.

If t2/y' is below the lower limit in condition (2), the entire second lens unit becomes short, which makes it difficult to compensate for the spherical aberration and transverse chromatic aberration caused by the difference in the height of the light rays. In addition, since the power of each lens of the second lens unit cannot be made as large as necessary due to the edge thickness of the positive lens of the second lens unit, spherical aberration compensation becomes difficult. If t2/y' exceeds the upper limit in condition (2), the length of the second lens unit becomes large, which makes it impossible to reduce the length of the optical system along the camera's depth.

The conventional models described above (Japanese Laid-Open Patents Sho 64-74521, Hei 1-116615, etc.) have a three-component construction comprising negative, positive and negative lens units aligned in that order from the object side, as in the case of the present invention. However, because the second lens unit is so thick that condition (2) cannot be met, they cannot realize compactness of the camera in terms of its depth. By contrast, the zoom lens system of the present invention has a construction which meets condition (2), as a result of which the second lens unit is compact along the optical axis, allowing compactness of the camera in terms of its depth.

As described above, to ensure performance the second lens unit having a positive refractive power must contain at least one positive lens and one negative lens. In an optical system of this type, it is necessary to compensate for monochromatic aberrations in particular independently in each lens unit. In order to do so, if a positive lens and negative lens are combined and located in the second lens unit, spherical aberration and coma aberration can be compensated for independently in the second lens unit.

Using said construction, if the following condition (3) is met, a zoom lens system which is further compact can be realized.

$$15 < |(fw/f1) \times W0| < 40 \quad (3)$$

In said condition, fw represents the focal length of the entire system in the shortest focal length condition; f1 represents the focal length of the first lens unit; and W0 represents the distance between the tip of the lens system to the film surface in the shortest focal length condition.

If $|(fw/f1) \times W0|$ is below the lower limit in condition (3), the effective apertures of the first and third lens units become large in order to secure lighting contrast in a short focal length condition, which negates a reduction of the camera's size along its lens diameter. In addition, if $|(fw/f1) \times W0|$ exceeds the upper limit, the length of the lens system in the shortest focal length condition becomes large, which also negates a reduction in size.

In the present invention, it is desirable to use an aspherical surface in the second lens unit. If an aspherical surface is located in the second lens unit, aberrations can be compensated for more effectively and the number of lenses can be minimized. Having fewer lenses can help realize a lightweight and compact zoom lens system. Moreover, if an aspherical surface is placed in the second lens unit, spherical aberration and coma aberration can be compensated for more effectively while the number of lenses is reduced, as a result of which the length of the second lens unit can be reduced, achieving a reduction in the length of the entire lens system.

The conventional models described above (Japanese Laid-Open Patents Sho 64-74521, Hei 1-116615, etc.) have a three-component construction consisting of negative, positive and negative lens units aligned in that order from the object side, as in the case of the present invention. However, the large number of lenses in the second lens unit leads to increased cost and weight in addition to a long second lens unit. By contrast, if an aspherical surface is used in the second lens unit of the zoom lens system of the present invention, high optical performance can be secured by means of effective aberration compensation as described above while the number of lenses of the second lens unit can be reduced. Therefore, a zoom lens system which is lighter and more compact than the conventional models can be realized at a lower cost.

Further, if a negative lens having aspherical surfaces on both sides is used for the negative lens of the second lens unit, good aberration compensation can be achieved. Having aspherical surfaces on both sides offers an advantage over having separate aspherical surfaces (having the positive and negative lenses of the second lens unit have one aspherical surface each, for example) in that manufacturing of the aspherical surfaces is easier during the manufacturing process.

Aspherical surfaces should preferably be used in the first or third lens units. In a wide angle zoom lens system, in particular, having an aspherical surface in the first lens unit is effective in the compensation for distortion in a short focal length condition. On the other hand, if an aspherical surface is placed in the third lens unit, distortion and coma aberration can be compensated for effectively.

As described above, in order to realize a zoom lens system suitable as an underwater camera, it is desirable that the first lens unit keeps stationary during zooming. Due to the construction of the lens mount, it is almost an essential condition that the lens unit coming in contact with water not move during operation of the camera while it is used underwater. Using the present invention, even where the first lens unit is fixed during zooming, compactness is not lost as a result of said construction while a high level of optical performance is maintained. Moreover, in said conventional models equipped with a non-powered barrier that is fixed during zooming, the large effective aperture of the barrier prevents the camera from becoming compact in terms of height and width. With the present invention, these problems does not occur.

It is preferred that the construction be such that the positive second lens unit is zoomed out during focusing. This is because if the focusing is performed by zooming out the second lens unit, good performance can be secured at close range photo-taking. For example, if the construction were such that the first lens unit is zoomed out for focusing, it would be not suitable as a camera lens for underwater photo-taking, as described above. If rear focusing using the third lens unit were adopted, the reduction in lighting contrast in a short focal length condition would become marked, which is not desirable.

In a construction that meets condition (3), it is preferable that the following condition (4) also be met. By meeting condition (4), better performance in close range phototaking can be secured.

$$15 < |(fw/f1) \times W0| < 30 \quad (4)$$

In condition (4), if $|(fw/f1) \times W0|$ exceeds the upper limit, the power of the second lens unit must be relatively increased with the increase in power of the first lens unit, which increases the convergence in close-range phototaking, making it difficult to accurately compensate for spherical aberration.

Embodiments of the present invention are shown below using specific numbers. In each embodiment, ri (i=1, 2, 3, ...) represents the radius of curvature of the ith lens surface from the object side; di (i=1, 2, 3, ...) represents the ith axial distance from the object side; and Ni (i=1, 2, 3, ...) and vi (i=1, 2, 3, ...) represent the refractive index and the Abbe number, to the d-line of the ith lens from the object side, respectively. f represents the focal length of the entire zoom lens system and F NO represents the F-number.

In each embodiment, the surfaces marked with asterisks in the radius of curvature column are aspherical, and are defined by the following equation which represents a surface configuration of an aspherical surface.

$$X = \frac{CY^2}{1+\sqrt{1-\epsilon Y^2 C^2}} + \sum_i A i Y^i$$

In said equation, X represents the amount of displacement from the reference surface along the optical axis; Y represents height in a direction vertical to the optical axis; C represents a paraxial radius of curvature; e represents a quadric surface parameter; and Ai represents an ith-order aspherical coefficient.

Embodiment 1 f = 29.0~40.0~56.0, F NO = 3.62~4.72~6.01

| Radius of curvature | | Axial distance | Refractive index | | Abbe number |
|---|---|---|---|---|---|
| r1 | −388.291 | | | | |
| | | d1 1.000 | N1 1.52584 | v1 | 52.06 |
| r2 | 22.872 | | | | |
| | | d2 0.500 | | | |
| r3 | 24.528 | | | | |
| | | d3 3.500 | N2 1.80500 | v2 | 40.97 |
| r4 | 41.358 | | | | |
| | | d4 18.000~11.696~1.653 | | | |
| r5* | 19.296 | | | | |
| | | d5 2.450 | N3 1.79850 | v3 | 22.60 |
| r6* | 13.855 | | | | |
| | | d6 3.000 | | | |
| r7 | 39.306 | | | | |
| | | d7 3.800 | N4 1.51728 | v4 | 69.43 |
| r8 | −11.637 | | | | |
| | | d8 12.829~7.834~4.911 | | | |
| r9* | −65.280 | | | | |
| | | d9 3.350 | N5 1.52510 | v5 | 56.38 |
| r10 | −23.492 | | | | |
| | | d10 4.450 | | | |
| r11 | −12.977 | | | | |
| | | d11 1.000 | N6 1.63854 | v6 | 55.62 |
| r12 | 1784.089 | | | | |

Σd = 53.879~42.579~29.614

Aspherical Surface Coefficients r5: e=0.10000×10
  A4=−0.34056×10$^{-3}$
  A6=−0.19147×10$^{-5}$
  A8=−0.90488×10$^{-8}$
  A10=−0.28594×10$^{-10}$
r6: e=0.10000×10
  A4=−0.29546×10$^{-3}$
  A6=−0.15539×10$^{-5}$
  A8=0.12951×10$^{-7}$
  A10=0.11530×10$^{-9}$
r9: e=0.10000×10
  A3=0.55964×10$^{-4}$
  A4=0.28487×10$^{-4}$
  A5=−0.23841×10$^{-5}$
  A6=−0.27640×10$^{-6}$
  A7=−0.50073×10$^{-7}$
  A8=0.26638×10$^{-7}$
  A9=−0.23884×10$^{-8}$
  A10=0.54324×10$^{-11}$
  A11=−0.14502×10$^{-11}$
  A12=0.78652×10$^{-12}$

Embodiment 2 f = 28.7~40.0~56.0, F NO = 3.62~4.68~5.85

| Radius of curvature | | Axial distance | Refractive index | | Abbe number |
|---|---|---|---|---|---|
| r1 | −618.001 | | | | |
| | | d1 1.000 | N1 1.69350 | v1 | 50.29 |
| r2 | 17.058 | | | | |
| | | d2 1.131 | | | |
| r3 | 17.990 | | | | |
| | | d3 4.800 | N2 1.80700 | v2 | 39.79 |
| r4* | 43.453 | | | | |
| | | d4 17.500~10.526~1.012 | | | |
| r5* | 37.220 | | | | |
| | | d5 2.819 | N3 1.80518 | v3 | 25.43 |
| r6* | 20.296 | | | | |
| | | d6 0.627 | | | |
| r7 | 29.694 | | | | |
| | | d7 4.375 | N4 1.48749 | v4 | 70.44 |
| r8 | −10.290 | | | | |
| | | d8 10.481~6.382~4.500 | | | |
| r9* | −95.670 | | | | |
| | | d9 3.350 | N5 1.52510 | v5 | 56.38 |
| r10 | −24.843 | | | | |
| | | d10 4.576 | | | |
| r11 | −9.611 | | | | |
| | | d11 1.000 | N6 1.48749 | v6 | 70.44 |
| r12 | 1784.089 | | | | |

Σd = 51.660~40.586~29.191

Aspherical Surface Coefficients r4: e=0.10000×10
  A4=−0.21910×10$^{-5}$
  A6=0.81146×10$^{-8}$
  A8=−0.21505×10$^{-9}$
  A10=0.76748×10$^{-12}$
r5: e=0.10000×10
  A4=−0.41693×10$^{-3}$
  A6=−0.22617×10$^{-5}$
  A8=−0.18938×10$^{-7}$
  A10=−0.10685×10$^{-9}$
r6: e=0.10000×10
  A4=−0.31075×10$^{-3}$
  A6=−0.51679×10$^{-6}$
  A8=0.19094×10$^{-7}$
  A10=0.12790×10$^{-9}$
r9: e=0.10000×10

A3=0.55964×10$^{-4}$
A4=0.39386×10$^{-4}$
A5=−0.20210×10$^{-6}$
A6=−0.42301×10$^{-7}$
A7=−0.30934×10$^{-7}$
A8=0.21613×10$^{-7}$
A9=−0.27773×10$^{-8}$
A10=0.72601×10$^{-10}$
A11=0.11466×10$^{-12}$
A12=0.10923×10$^{-11}$

Embodiment 3 f = 28.7~40.0~56.0, F NO = 3.62~4.78~6.11

|  | Radius of curvature |  | Axial distance |  | Refractive index |  | Abbe number |
|---|---|---|---|---|---|---|---|
| r1 | −618.001 | | | | | | |
| | | d1 | 1.000 | N1 | 1.69680 | ν1 | 55.43 |
| r2 | 19.043 | | | | | | |
| | | d2 | 1.131 | | | | |
| r3 | 19.247 | | | | | | |
| | | d3 | 4.800 | N2 | 1.80700 | ν2 | 39.79 |
| r4 | 51.488 | | | | | | |
| | | d4 | 18.500~11.756~1.314 | | | | |
| r5* | 30.537 | | | | | | |
| | | d5 | 2.819 | N3 | 1.70055 | ν3 | 30.11 |
| r6* | 12.493 | | | | | | |
| | | d6 | 0.627 | | | | |
| r7 | 19.009 | | | | | | |
| | | d7 | 4.501 | N4 | 1.48749 | ν4 | 70.44 |
| r8 | −9.911 | | | | | | |
| | | d8 | 12.481~7.217~4.200 | | | | |
| r9* | −89.543 | | | | | | |
| | | d9 | 3.350 | N5 | 1.58340 | ν5 | 30.23 |
| r10 | −26.690 | | | | | | |
| | | d10 | 4.576 | | | | |
| r11 | −10.309 | | | | | | |
| | | d11 | 1.000 | N6 | 1.51823 | ν6 | 58.96 |
| r12 | 1784.089 | | | | | | |

Σd = 54.786~42.777~29.319

Aspherical Surface Coefficients r5: e=0.10000×10
 A4=−0.52004×10$^{-3}$
 A6=−0.16282×10$^{-5}$
 A8=−0.17228×10$^{-7}$
 A10=−0.14369×10$^{-9}$
r6: e=0.10000×10
 A4=−0.44161×10$^{-3}$
 A6=0.76249×10$^{-6}$
 A8=0.22617×10$^{-7}$
 A10=0.12730×10$^{-9}$
r9: e=0.10000×10
 A3=0.55964×10$^{-4}$
 A4=0.27477×10$^{-4}$
 A5=0.22326×10$^{-5}$
 A6=−0.26809×10$^{-6}$
 A7=−0.76841×10$^{-7}$
 A8=0.26384×10$^{-7}$
 A9=−0.22849×10$^{-8}$
 A10=0.92719×10$^{-10}$
 A11=−0.32029×10$^{-11}$
 A12=0.30877×10$^{-12}$

Embodiment 4 f = 28.7~40.0~56.0, F NO = 3.62~4.62~5.73

|  | Radius of curvature |  | Axial distance |  | Refractive index |  | Abbe number |
|---|---|---|---|---|---|---|---|
| r1 | −618.001 | | | | | | |
| | | d1 | 1.000 | N1 | 1.69680 | ν1 | 55.43 |
| r2 | 16.252 | | | | | | |
| | | d2 | 1.131 | | | | |
| r3 | 17.351 | | | | | | |
| | | d3 | 4.800 | N2 | 1.80700 | ν2 | 39.79 |
| r4 | 37.507 | | | | | | |
| | | d4 | 17.500~10.509~1.719 | | | | |
| r5 | 9.142 | | | | | | |
| | | d5 | 5.021 | N3 | 1.48749 | ν3 | 70.44 |
| r6 | −21.772 | | | | | | |
| | | d6 | 0.627 | | | | |
| r7* | −10.701 | | | | | | |
| | | d7 | 3.322 | N4 | 1.70055 | ν4 | 30.11 |
| r8* | −20.177 | | | | | | |
| | | d8 | 9.121~4.785~3.600 | | | | |
| r9* | −30.594 | | | | | | |
| | | d9 | 3.350 | N5 | 1.58340 | ν5 | 30.23 |
| r10 | −19.086 | | | | | | |
| | | d10 | 3.733 | | | | |
| r11 | −10.127 | | | | | | |
| | | d11 | 1.000 | N6 | 1.51602 | ν6 | 56.77 |
| r12 | −40.844 | | | | | | |

Σd = 50.606~39.279~29.303

Aspherical Surface Coefficients r7: e=0.10000×10
 A4=0.36203×10$^{-3}$
 A6=0.15224×10$^{-5}$
 A8=−0.13740×10$^{-7}$
 A10=−0.10641×10$^{-9}$
r8: e=0.10000×10
 A4=0.40479×10$^{-3}$
 A6=0.24775×10$^{-5}$
 A8=0.18262×10$^{-7}$
 A10=0.99273×10$^{-10}$
r9: e=0.10000×10
 A3=0.55964×10$^{-4}$
 A4=0.40187×10$^{-4}$
 A5=−0.25207×10$^{-5}$
 A6=−0.14776×10$^{-6}$
 A7=−0.26686×10$^{-7}$
 A8=0.31615×10$^{-7}$
 A9=−0.26931×10$^{-8}$
 A10=−0.27530×10$^{-10}$
 A11=−0.39628×10$^{-12}$
 A12=0.10466×10$^{-11}$

Embodiment 5 f = 28.7~40.0~56.0, F NO = 3.62~4.68~5.86

|  | Radius of curvature |  | Axial distance |  | Refractive index |  | Abbe number |
|---|---|---|---|---|---|---|---|
| r1 | −618.001 | | | | | | |
| | | d1 | 1.000 | N1 | 1.80100 | ν1 | 46.54 |
| r2 | 17.744 | | | | | | |
| | | d2 | 1.131 | | | | |
| r3 | 18.554 | | | | | | |
| | | d3 | 5.000 | N2 | 1.80750 | ν2 | 35.43 |

-continued

Embodiment 5 f = 28.7~40.0~56.0, F NO = 3.62~4.68~5.86

| | Radius of curvature | | Axial distance | | Refractive index | | Abbe number |
|---|---|---|---|---|---|---|---|
| r4 | 59.284 | | | | | | |
| | | d4 | 18.000~11.058~1.708 | | | | |
| r5 | 9.344 | | | | | | |
| | | d5 | 5.000 | N3 | 1.48749 | v3 | 70.44 |
| r6 | −24.196 | | | | | | |
| | | d6 | 0.627 | | | | |
| r7* | −11.287 | | | | | | |
| | | d7 | 2.800 | N4 | 1.75520 | v4 | 27.51 |
| r8* | −19.945 | | | | | | |
| | | d8 | 10.424~5.585~3.600 | | | | |
| r9* | −21.636 | | | | | | |
| | | d9 | 3.350 | N5 | 1.58340 | v5 | 30.23 |
| r10 | −14.695 | | | | | | |
| | | d10 | 3.800 | | | | |
| r11 | −9.176 | | | | | | |
| | | d11 | 1.000 | N6 | 1.51823 | v6 | 58.96 |
| r12 | −36.766 | | | | | | |
| | Σd = 52.133~40.351~29.017 | | | | | | |

Aspherical Surface Coefficients r7: e=0.10000×10
 A4=0.37145×10$^{-3}$
 A6=0.16937×10$^{-5}$
 A8=−0.15777×10$^{-7}$
 A10=−0.13227×10$^{-9}$
r8: e=0.10000×10
 A4=0.39854×10$^{-3}$
 A6=0.24461×10$^{-5}$
 A8=0.19043×10$^{-7}$
 A10=0.10309×10$^{-9}$
r9: e=0.10000×10
 A3=0.55964×10$^{-4}$
 A4=0.27673×10$^{-4}$
 A5=−0.19534×10$^{-5}$
 A6=−0.12079×10$^{-6}$
 A7=−0.23385×10$^{-7}$
 A8=0.34891×10$^{-7}$
 A9=−0.26295×10$^{-8}$
 A10=−0.99229×10$^{-11}$
 A11=−0.37901×10$^{-12}$
 A12=0.10410×10$^{-11}$

Embodiment 6 f = 25.5~39.6~48.6, F NO = 3.62~5.00~5.77

| | Radius of curvature | | Axial distance | | Refractive index | | Abbe number |
|---|---|---|---|---|---|---|---|
| r1 | −549.094 | | | | | | |
| | | d1 | 0.889 | N1 | 1.69350 | v1 | 50.29 |
| r2 | 15.252 | | | | | | |
| | | d2 | 1.005 | | | | |
| r3 | 16.318 | | | | | | |
| | | d3 | 5.000 | N2 | 1.80700 | v2 | 39.79 |
| r4* | 40.091 | | | | | | |
| | | d4 | 16.500~7.000~2.500 | | | | |
| r5* | 33.286 | | | | | | |
| | | d5 | 2.505 | N3 | 1.84666 | v3 | 23.82 |
| r6* | 19.280 | | | | | | |
| | | d6 | 0.557 | | | | |

-continued

Embodiment 6 f = 25.5~39.6~48.6, F NO = 3.62~5.00~5.77

| | Radius of curvature | | Axial distance | | Refractive index | | Abbe number |
|---|---|---|---|---|---|---|---|
| r7 | 29.681 | | | | | | |
| | | d7 | 3.740 | N4 | 1.48749 | v4 | 70.44 |
| r8 | −9.138 | | | | | | |
| | | d8 | 9.270~5.168~3.998 | | | | |
| r9* | −83.576 | | | | | | |
| | | d9 | 2.976 | N5 | 1.54072 | v5 | 47.22 |
| r10 | −22.287 | | | | | | |
| | | d10 | 4.065 | | | | |
| r11 | −8.508 | | | | | | |
| | | d11 | 0.889 | N6 | 1.48749 | v6 | 70.44 |
| r12 | 1585.162 | | | | | | |
| | Σd = 47.397~33.794~28.124 | | | | | | |

Figure 2:
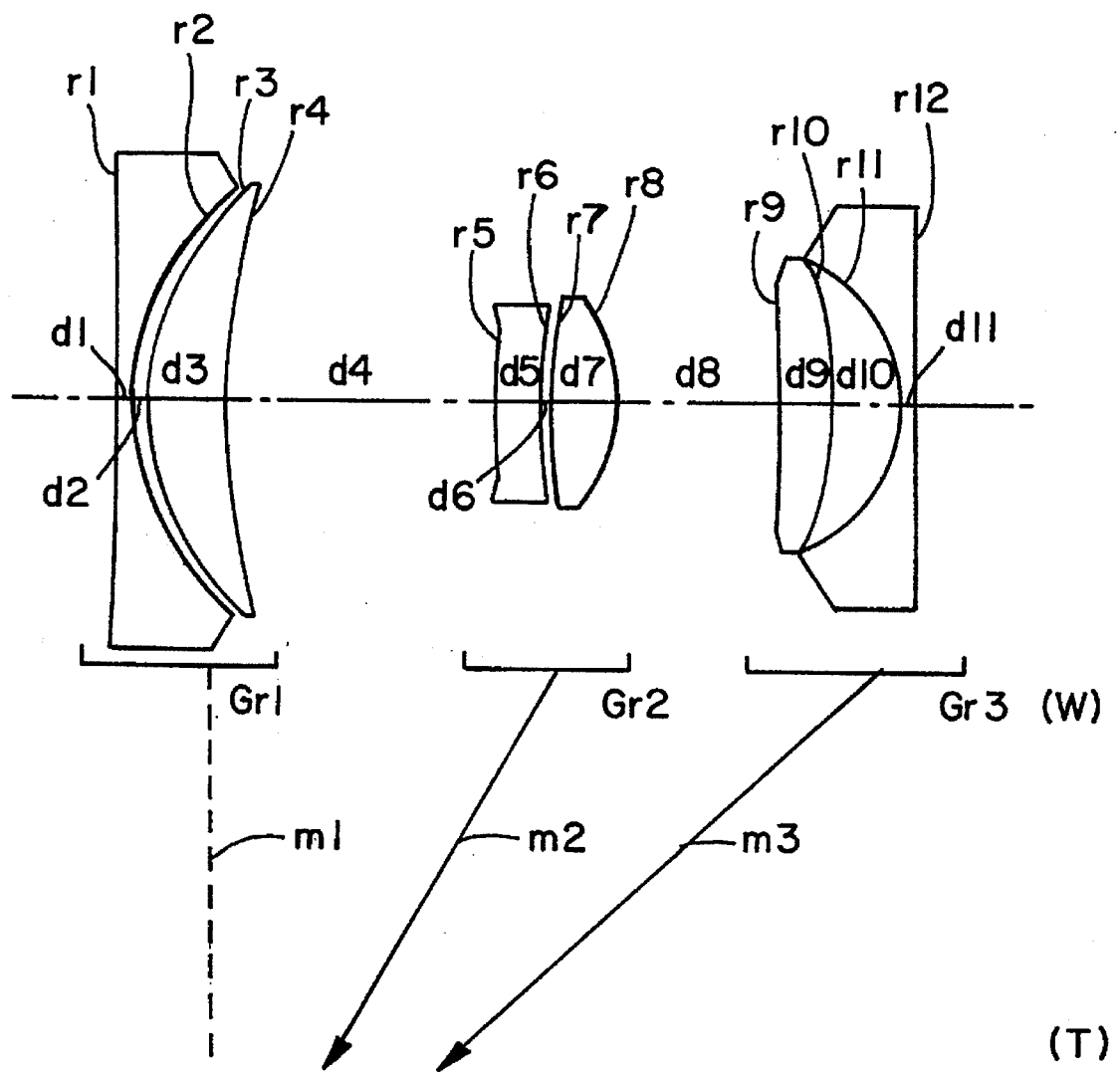
FIG. 2 shows the construction of the lenses in a second embodiment of the present invention.
Figure 3:
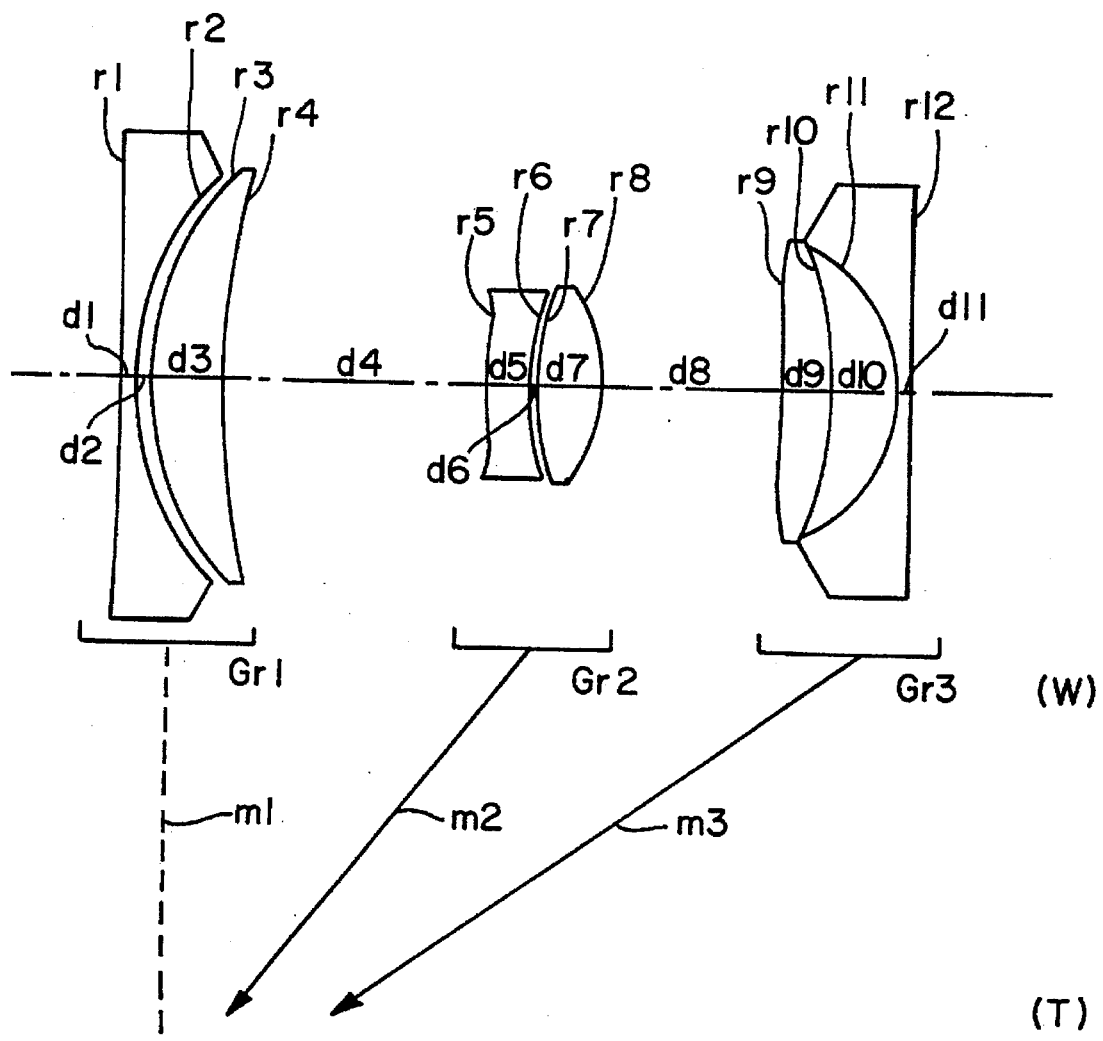
FIG. 3 shows the construction of the lenses in a third embodiment of the present invention.
Figure 4:
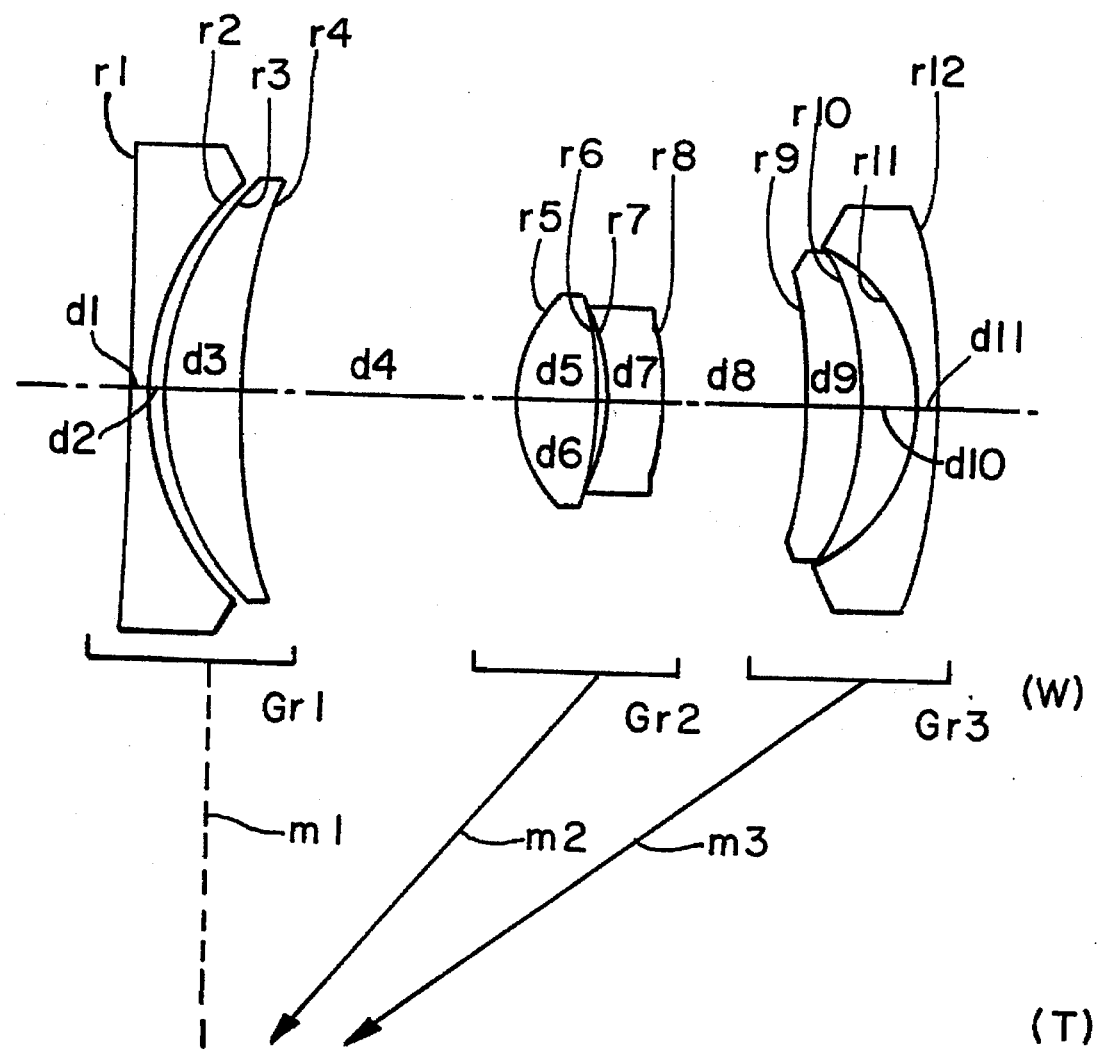
FIG. 4 shows the construction of the lenses in a fourth embodiment of the present invention.
Figure 5:
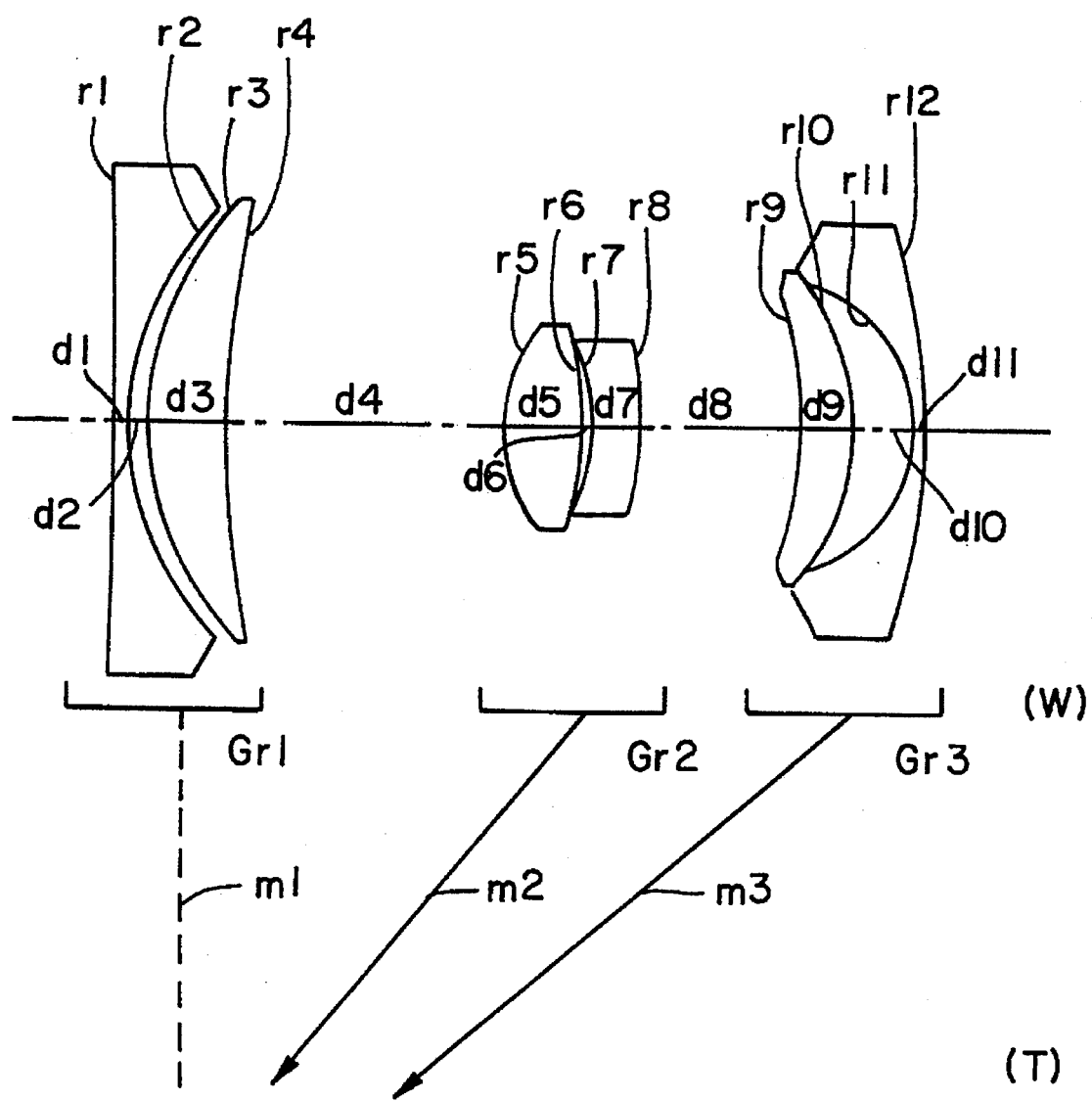
FIG. 5 shows the construction of the lenses in a fifth embodiment of the present invention.
Figure 6:
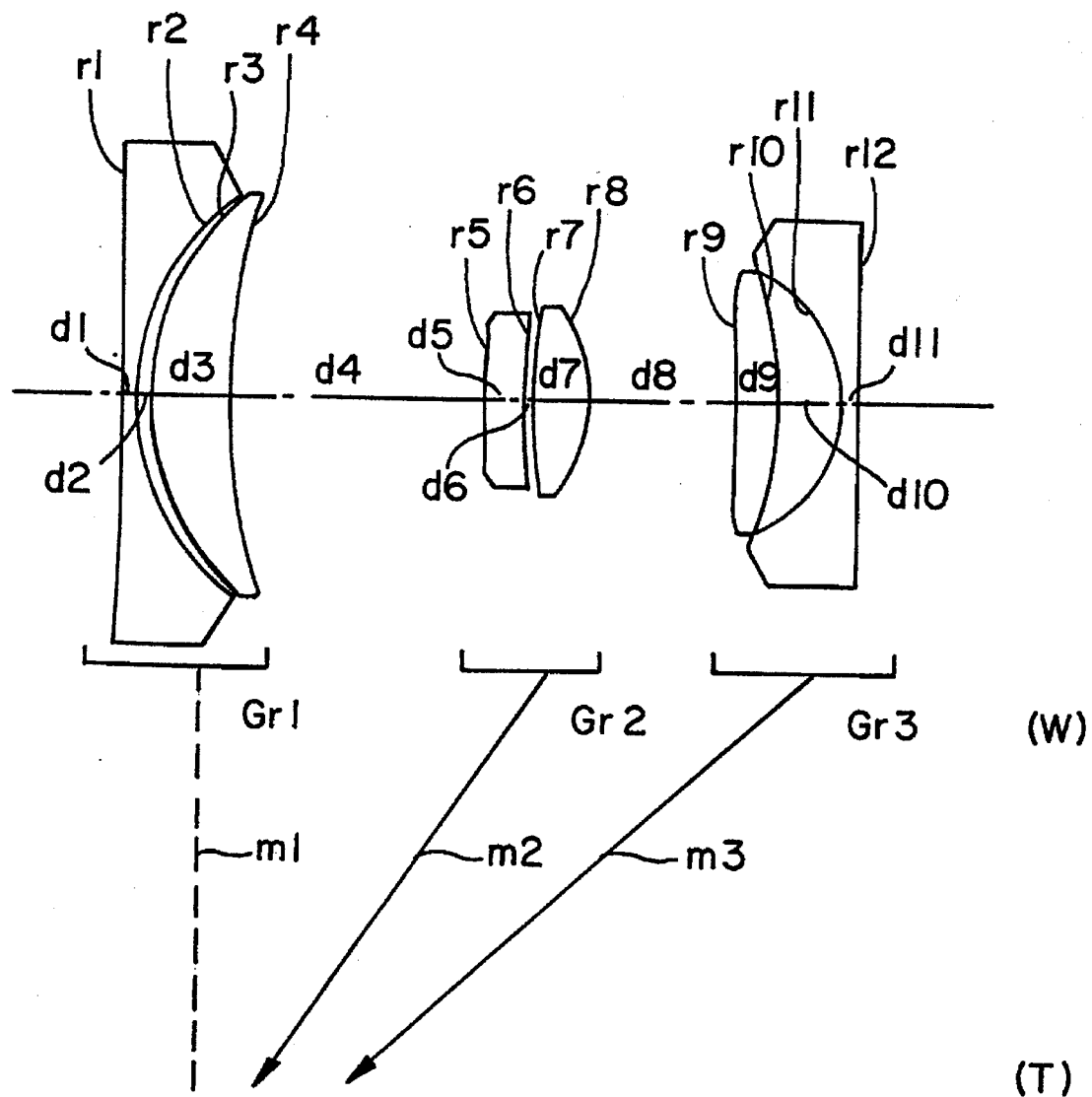
FIG. 6 shows the construction of the lenses in a sixth embodiment of the present invention.

Aspherical Surface Coefficients r4: e=0.10000×10
 A4=−0.58622×10$^{-5}$
 A6=0.55777×10$^{-7}$
 A8=−0.78973×10$^{-9}$
 A10=0.23640×10$^{-11}$
r5: e=0.10000×10
 A4=−0.59880×10$^{-3}$
 A6=−0.40485×10$^{-5}$
 A8=−0.43447×10$^{-7}$
 A10=−0.31201×10$^{-9}$
r6: e=0.10000×10
 A4=−0.45665×10$^{-3}$
 A6=−0.10128×10$^{-5}$
 A8=0.42417×10$^{-7}$
 A10=0.36281×10$^{-9}$
r9: e=0.10000×10
 A3=0.70892×10$^{-4}$
 A4=0.60642×10$^{-4}$
 A5=−0.18549×10$^{-5}$
 A6=−0.12151×10$^{-6}$
 A7=−0.59251×10$^{-7}$
 A8=0.54404×10$^{-7}$
 A9=−0.71229×10$^{-8}$
 A10=0.15165×10$^{-9}$
 A11=0.25685×10$^{-13}$
 A12=0.39647×10$^{-11}$ FIGS. 1 through 6 show the constructions of the lens units of embodiments 1 through 6 described above. They show the positions of the lenses in the shortest focal length condition. Loci m1, m2 and m3 in the drawings show the movements of first lens unit Gr1, second lens unit Gr2 and third lens unit Gr3 during zooming from their positions in the shortest focal length condition to their positions in the longest focal length condition, respectively. Each embodiment has a three-component construction consisting of negative, positive and negative lens units, wherein each lens unit consists of two lenses, and wherein the first lens unit keeps stationary during zooming. Second lens unit Gr2 of each embodiment consists of a positive lens and a negative lens.

Embodiments 1 through 3 and 6 have, from the object side, positive first lens unit Gr1 consisting of a negative lens having concave surfaces on both sides and a positive meniscus lens having a convex surface on the object side, second lens unit Gr2 consisting of a negative meniscus lens having a concave surface on the image side and a positive lens having convex surfaces on both sides, and third lens unit Gr3 consisting of a positive meniscus lens having a convex surface on the image side and a negative lens having concave surfaces on both sides. Embodiments 4 and 5 have, from the object side, first lens unit Gr1 consisting of a negative lens having concave surfaces on both sides and a positive meniscus lens having a convex surface on the object side, second lens unit Gr2 consisting of a positive lens having convex surfaces on both sides and a negative meniscus lens having a concave surface on the object side, and third lens unit Gr3 consisting of a positive meniscus lens having a convex surface on the image side and a negative meniscus lens having a concave surface on the object side.

In embodiments 1 and 3, both sides of the negative meniscus lens of second lens unit Gr2, which has a concave surface on the image side, and the object side surface of the positive meniscus lens of third lens unit Gr3, which has a convex surface on the image side, are aspherical. In embodiments 2 and 6, the image side surface of the positive meniscus lens of first lens unit Gr1, which has a convex surface on the object side, both sides of the negative meniscus lens of second lens unit Gr2, which has a concave surface on the image side, and the object side surface of the positive meniscus lens of third lens unit Gr3, which has a convex surface on the image side, are aspherical. In embodiments 4 and 5, both sides of the positive lens of second lens unit Gr2, which has convex surfaces on both sides, and the object side surface of the positive meniscus lens of third lens unit Gr3, which has a convex surface on the image side, are aspherical.

Figure 11A:
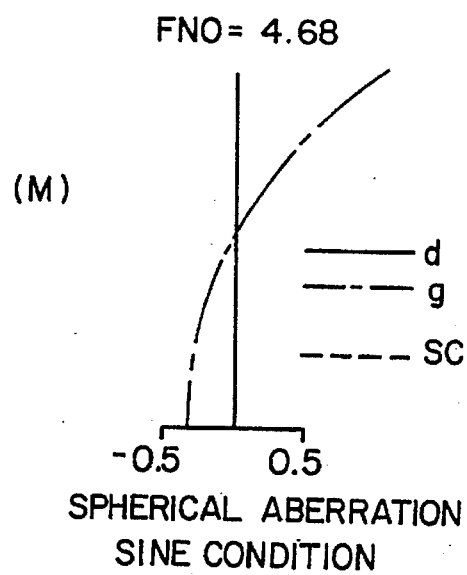
FIGS. 11A, 11B and 11C show aberration curves in the middle focal length condition in the second embodiment.
Figure 11B:
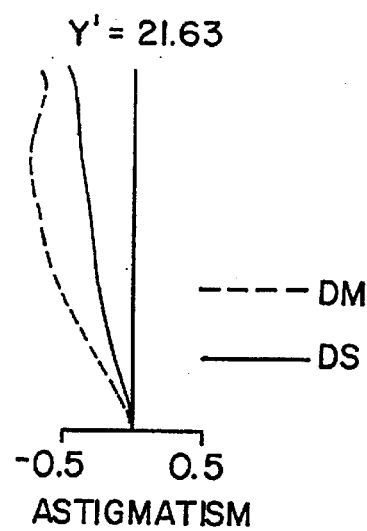
Figure 11C:
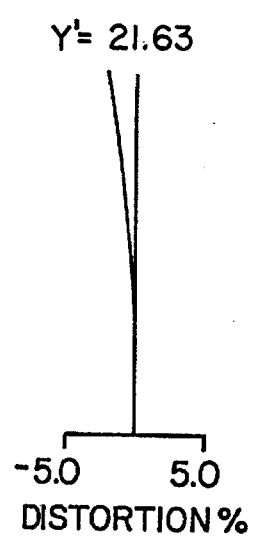
Figure 12A:
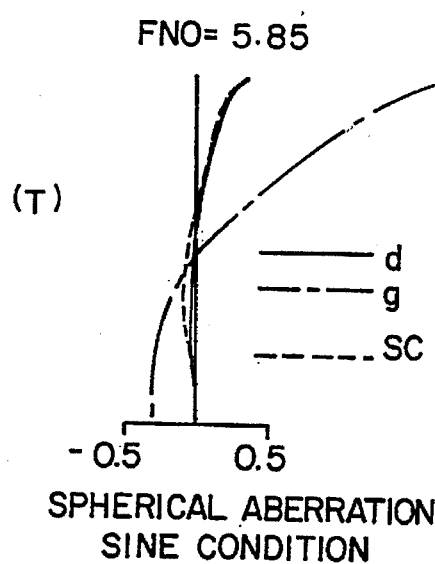
FIGS. 12A, 12B and 12C show aberration curves in the longest focal length condition in the second embodiment.
Figure 12B:
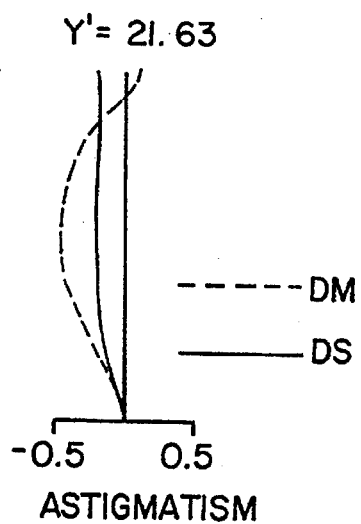
Figure 12C:
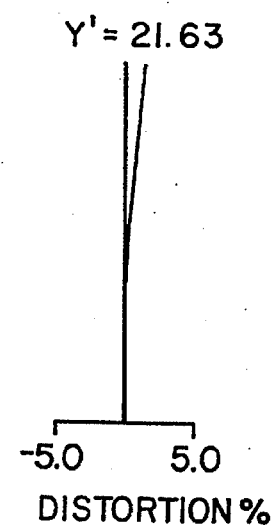
Figure 19A:
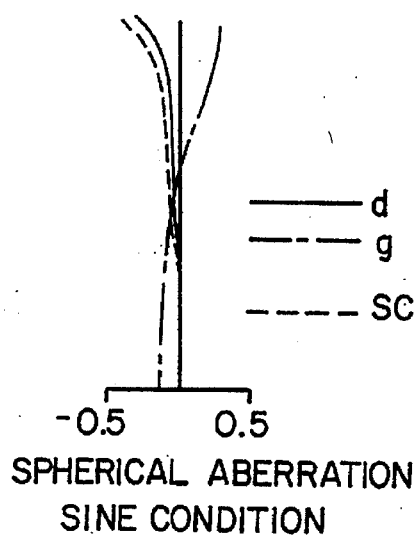
FIGS. 19A, 19B and 19C show aberration curves in the shortest focal length condition in the fifth embodiment.
Figure 19B:
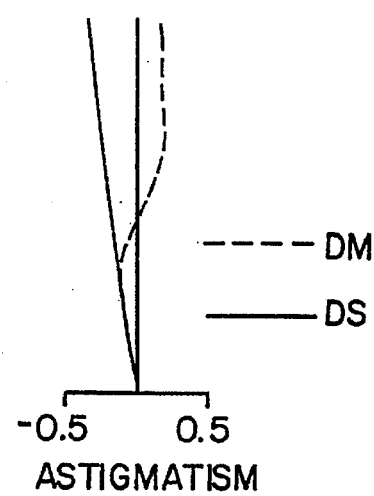
Figure 19C:
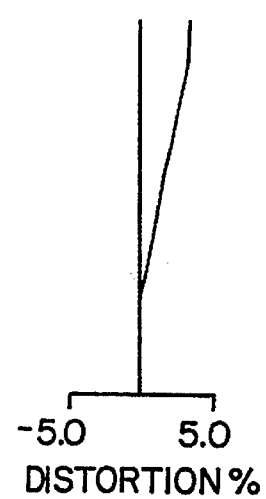
Figure 20A:
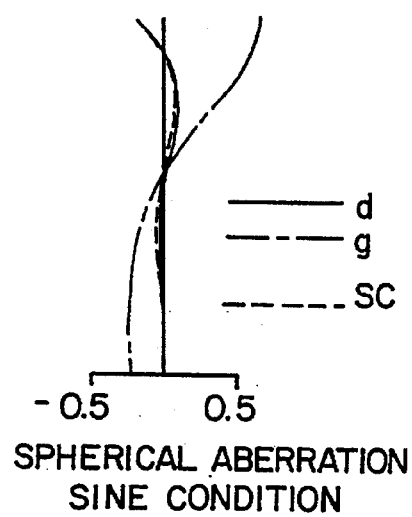
FIGS. 20A, 20B and 20C show aberration curves in the middle focal length condition in the fifth embodiment.
Figure 20B:
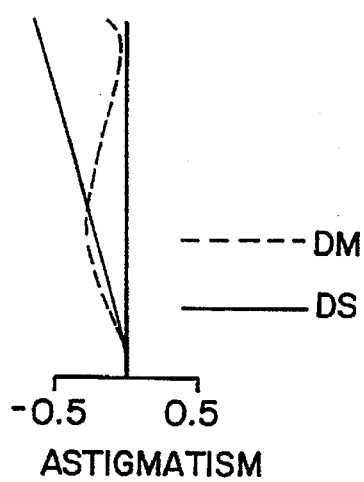
Figure 20C:
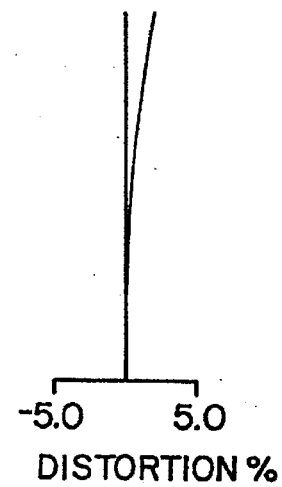
Figure 21A:
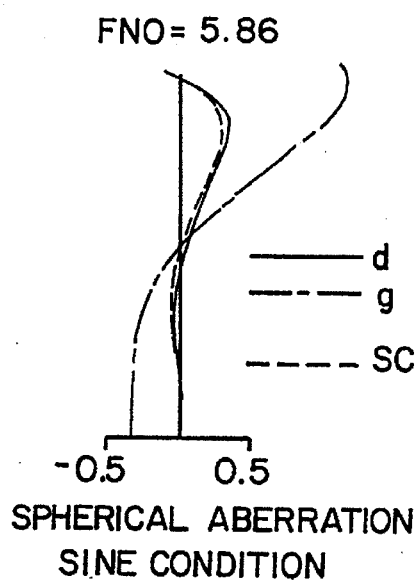
FIGS. 21A, 21B and 21C show aberration curves in the longest focal length condition in the fifth embodiment.
Figure 21B:
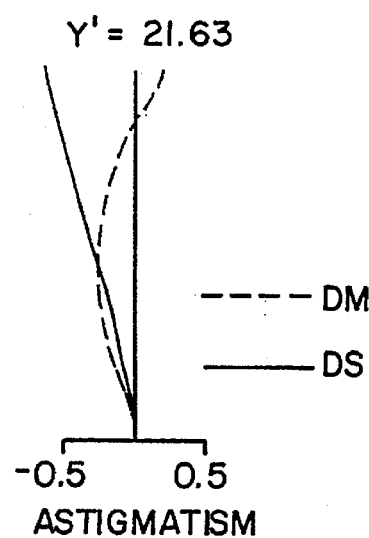
Figure 21C:
Figure 22A:
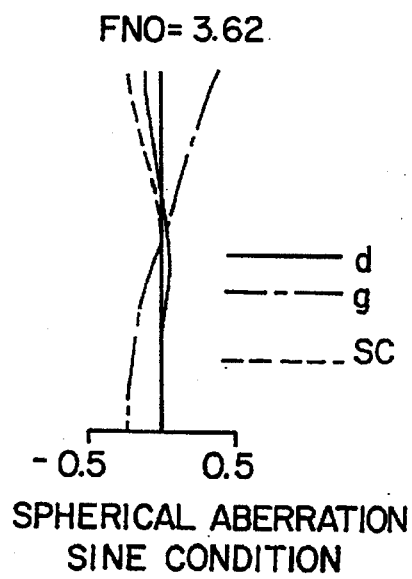
FIGS. 22A, 22B and 22C show aberration curves in the shortest focal length condition in the sixth embodiment.
Figure 22B:
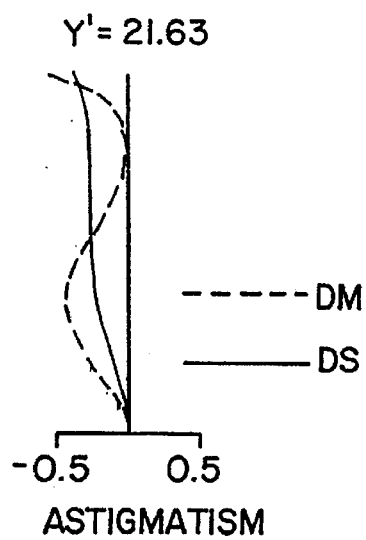
Figure 22C:
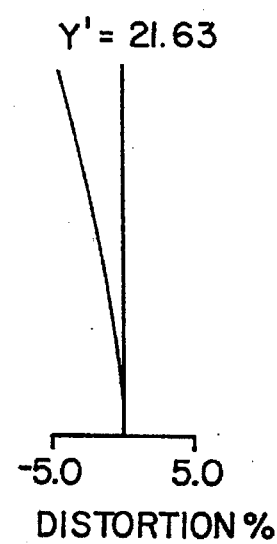

FIGS. 7A–7C, 10A–10C, 13A–13C, 16A–16C, 19A–19C and 22A–22C show the aberrations of embodiments 1 through 6 in the shortest focal length condition. FIGS. 8A–8C, 11A–11C, 14A–14C, 17A–17C, 20A–20C and 23A–23C show the aberrations of embodiments 1 through 6 in the middle focal length condition. FIGS. 9A–9C, 12A–12C, 15A–15C, 18A–18C, 21A–21C and 24A–24C show the aberrations of embodiments 1 through 6 in the longest focal length condition.

In the drawings indicating spherical aberrations, solid line d represents the spherical aberration with regard to the d-line, and dashed line g represents the spherical aberration with regard to the g-line, while the dotted line SC represents the sine condition. In the drawings indicating astigmatism, dotted line DM and solid line DS represent the astigmatism on the meridional surface and the sagittal surface, respectively.

Table 1 shows the numbers that meet conditions (1) through (3) in embodiments 1 through 6, as well as the construction of the lenses of second lens unit Gr2.

TABLE 1

|  | Second lens unit construction | t1/y | t2/y | l(fw/f1) × W0l |
|---|---|---|---|---|
| Embodiment 1 | −+ | 0.12 | 0.21 | 19.2 |
| Embodiment 2 | −+ | 0.16 | 0.18 | 26.1 |
| Embodiment 3 | −+ | 0.16 | 0.18 | 18.8 |
| Embodiment 4 | +− | 0.16 | 0.21 | 31.1 |
| Embodiment 5 | +− | 0.16 | 0.19 | 26.7 |
| Embodiment 6 | −+ | 0.16 | 0.16 | 23.8 |

Although the present invention has been fully described by way of examples with reference to the accompanying drawings, it is to be noted that various changes and modifications will be apparent to those skilled in the art. Therefore, unless otherwise such changes and modifications depart from the scope of the invention, they should be construed as being included therein.

What is claimed is:

1. A zoom lens system comprising sequentially from the object side a first lens unit having a negative refractive power, a second lens unit having a positive refractive power and a third lens unit having a negative refractive power, wherein zooming is performed by changing the distances between the lens units, wherein the second lens unit includes one positive lens and one negative lens, and wherein the following conditions are fulfilled:

$$0.08 < t1/y' < 0.25$$

$$0.08 < t2/y' < 0.28$$

where t1 represents the length of the first lens unit along the optical axis, t2 represents the length of the second lens unit along the optical axis, and y' represents the diagonal length of the film surface.

2. A zoom lens system according to claim 1, wherein the second lens unit includes an aspherical surface.

3. A zoom lens system according to claim 2, wherein the negative lens of the second lens unit has aspherical surfaces on both sides.

4. A zoom lens system according to claim 1, wherein the first lens unit includes an aspherical surface.

5. A zoom lens system according to claim 1, wherein the third lens unit includes an aspherical surface.

6. A zoom lens system according to claim 1, wherein the first lens unit keeps stationary during zooming.

7. A zoom lens system according to claim 1, wherein focusing is performed by shifting the second lens unit.

8. A zoom lens system comprising sequentially from the object side a first lens unit having a negative refractive power, a second lens unit having a positive refractive power and a third lens unit having a negative refractive power, wherein zooming is performed by changing the distances between the lens units, wherein the second lens unit includes one positive lens and one negative lens, and wherein the following conditions are fulfilled:

$$0.08 < t1/y' < 0.25$$

$$0.08 < t2/y' < 0.28$$

$$15 < l(fw/f1) \times W0l < 40$$

where t1 represents the length of the first lens unit along the optical axis, t2 represents the length of the second lens unit along the optical axis, y' represents the diagonal length of the film surface, fw represents the focal length of the entire system in the shortest focal length condition, f1 represents the focal length of the first lens unit, and w0 represents the distance between the tip of the lens system to the film surface in the shortest focal length condition.

9. A zoom lens system according to claim 8, wherein the following condition is further fulfilled:

$$15 < l(fw/f1) \times W0l < 30.$$

10. A zoom lens system according to claim 8, wherein the second lens unit includes an aspherical surface.

11. A zoom lens system according to claim 10, wherein the negative lens of the second lens unit has aspherical surfaces on both sides.

12. A zoom lens system according to claim 8, wherein the first lens unit includes an aspherical surface.

13. A zoom lens system according to claim 8, wherein the third lens unit includes an aspherical surface.

14. A zoom lens system according to claim 8, wherein the first lens unit keeps stationary during zooming.

15. A zoom lens system according to claim 8, wherein focusing is performed by shifting the second lens unit.

16. A zoom lens system consisting of sequentially from the object side:

a first lens unit having a negative refractive power;

a second lens unit having a positive refractive power and including one positive lens and one negative lens; and a third lens unit having a negative refractive power, wherein zooming is performed by shifting the second lens unit and the third lens unit, and focusing is performed by shifting the second lens unit, and wherein the following conditions are fulfilled:

$$0.08 < t1/y' < 0.25$$

$$0.08 < t2/y' < 0.28$$

where t1 represents the length of the first lens unit along the optical axis, t2 represents the length of the second lens unit along the optical axis, and y' represents the diagonal length of the film surface.

17. A zoom lens system according to claim 16, wherein the following condition is further fulfilled:

$$15 < |(fw/f1) \times W0| < 30$$

where fw represents the focal length of the entire system in the shortest focal length condition, f1 represents the focal length of the first lens unit, and W0 represents the distance between the tip of the lens system to the film surface in the shortest focal length condition.

18. A zoom lens system according to claim 16, wherein the negative lens of the second lens unit has aspherical surfaces on both sides.

19. A compact zoom lens system for use in underwater photography comprising, sequentially, from the object side:

a first lens unit consisting of two lens elements having a negative refractive power, a second lens unit consisting of two lens elements having a positive refractive power, and a third lens unit consisting of two lens elements having a negative refractive power, wherein zooming is performed by changing the distances between the lens units, wherein the second lens unit includes one positive lens and one negative lens, and wherein the following conditions are fulfilled:

$$0.08 < t1/y' < 0.25$$

$$0.08 < t2/y' < 0.28$$

where t1 represents the length of the first lens unit along the optical axis, t2 represents the length of the second lens unit along the optical axis, and y' represents the diagonal length of a film surface.

20. A zoom lens system comprising, sequentially, from the object side:

a first lens unit having a negative refractive power, a second lens unit having a positive refractive power, and a third lens unit having a negative refractive power, wherein zooming is performed by moving only the second and third lens units while the first lens unit remains fixed, wherein the second lens unit includes one positive lens and one negative lens, and wherein the following conditions are fulfilled;

$$0.08 < t1/y' < 0.25$$

$$0.08 < t2/y' < 0.28$$

$$15 < |(f2/f1) \times W0| < 40$$

wherein t1 represents the length of the first lens unit along the optical axis, t2 represents the length of the second lens unit along the optical axis, y' represents a diagonal length of a film surface, f2 represents the focal length of the entire system in the shortest focal length condition, f1 represents the focal length of the first lens unit, and W0 represents the distance between a tip of the lens system to the film surface in the shortest focal length condition.

21. A compact zoom lens system comprising, sequentially, from the object side:

a first lens unit having a negative refractive power, a second lens unit having a positive refractive power, and a third lens unit having a negative refractive power, wherein zooming is performed by moving the second and third lens units while the first lens unit remains stationary, wherein the second lens unit includes one positive lens and one negative lens and is moved during a focusing mode of operation, and wherein the following conditions are fulfilled:

$$0.08 < t1/y' < 0.25$$

$$0.08 < t2/y' < 0.28$$

where t1 represents the length of the first lens unit along the optical axis, t2 represents the length of the second lens unit along the optical axis, and y' represents a diagonal length of a film surface.

* * * * *